United States Patent
Kuo et al.

(10) Patent No.: US 12,504,640 B2
(45) Date of Patent: Dec. 23, 2025

(54) FOLDABLE LIGHT-SHIELDING HOOD AND PORTABLE ELECTRONIC DEVICE

(71) Applicant: ViewSonic International Corporation, New Taipei (TW)

(72) Inventors: Yung-Fu Kuo, New Taipei (TW); Wen-Kang Wei, New Taipei (TW); Pai-I Chen, New Taipei (TW)

(73) Assignee: ViewSonic International Corporation, New Taipei (TW)

( * ) Notice: Subject to any disclaimer, the term of this patent is extended or adjusted under 35 U.S.C. 154(b) by 483 days.

(21) Appl. No.: 18/318,747

(22) Filed: May 17, 2023

(65) Prior Publication Data

US 2023/0384604 A1   Nov. 30, 2023

(30) Foreign Application Priority Data

May 31, 2022   (TW) ................................ 111205704

(51) Int. Cl.
*G02B 27/04* (2006.01)
*G06F 1/16* (2006.01)

(52) U.S. Cl.
CPC ........... *G02B 27/04* (2013.01); *G06F 1/1603* (2013.01)

(58) Field of Classification Search
CPC .... G06F 1/1603; G06F 1/1626; G06F 1/1629; G06F 2200/1633; G02B 27/04
See application file for complete search history.

(56) References Cited

U.S. PATENT DOCUMENTS

| | | | | |
|---|---|---|---|---|
| 5,877,896 A | * | 3/1999 | Gremban | G06F 1/1603 359/601 |
| 6,302,546 B1 | * | 10/2001 | Kordiak | G06F 1/1601 359/608 |
| 2013/0229715 A1 | * | 9/2013 | Allen | G06F 1/1603 359/613 |

* cited by examiner

*Primary Examiner* — Angela M. Medich
(74) *Attorney, Agent, or Firm* — JCIPRNET

(57) ABSTRACT

A foldable light-shielding hood includes a plate body, a first supporting portion, a second supporting portion, a hanging portion, a first folded portion, and a second folded portion. The first supporting portion, the second supporting portion, and the hanging portion are foldably disposed to the plate body. The first folded portion is foldably disposed to the first supporting portion. The second folded portion is foldably disposed to the second supporting portion. The foldable light-shielding hood is adapted for hanging on a portable electronic device through the hanging portion. The first folded portion, the second folded portion, the hanging portion, the first supporting portion, the second supporting portion, and the plate body surround a shielding space, and the first folded portion, the second folded portion, and the hanging portion are adapted for being combined with the portable electronic device, and a display surface is located in the shielding space.

10 Claims, 14 Drawing Sheets

FOLDABLE LIGHT-SHIELDING HOOD AND PORTABLE ELECTRONIC DEVICE

CROSS-REFERENCE TO RELATED APPLICATION

This application claims the priority benefit of Taiwan application serial no. 111205704, filed on May 31, 2022. The entirety of the above-mentioned patent application is hereby incorporated by reference herein and made a part of this specification.

BACKGROUND

Technical Field

The disclosure relates to a light-shielding hood and an electronic device, and particularly relates to a foldable light-shielding hood and a portable electronic device having the foldable light-shielding hood.

Description of Related Art

Generally speaking, the job content of photographers may be divided into two types according to the shooting location: indoor shooting and outdoor shooting. In terms of outdoor shooting, electronic devices such as tablet computers and iPads require protection to avoid damage from collisions due to high-frequency mobile requirements. Furthermore, under the influence of high-brightness light sources in outdoor environments, bright light also needs to be blocked to make it easier to see the display on the screen. For the protection needs of electronic devices, there are so-called protective covers on the market, and for the bright light shielding needs of electronic devices, there are so-called light-shielding hoods on the market. However, when these two products are in use, photographers often replace the protective case and the light-shielding hood according to the two needs of protection and light shielding, and the photographers need to carry two items at a time, which is not convenient for the work of the photographers.

SUMMARY

The disclosure provides a foldable light-shielding hood and a portable electronic device, which helps solve the problem of inconvenience in use of the conventional protective cover and the light-shielding hood.

The foldable light-shielding hood of the disclosure includes a plate body, a first supporting portion, a second supporting portion, a hanging portion, a first folded portion, and a second folded portion. The first supporting portion is foldably disposed to a side of the plate body. The second supporting portion is foldably disposed to another side of the plate body. The hanging portion is foldably disposed to the plate body. The first folded portion is foldably disposed to the first supporting portion. The second folded portion is foldably disposed to the second supporting portion, and the hanging portion is located between the first folded portion and the second folded portion. The foldable light-shielding hood is adapted for transforming between a first state and a second state. In the first state, the first folded portion is folded on the first supporting portion, the second folded portion is folded on the second supporting portion, and the first supporting portion, the second supporting portion, and the hanging portion are folded on the plate body, so that the foldable light-shielding hood is adapted for hanging on a body of a portable electronic device through the hanging portion. In the second state, the first folded portion is unfolded relative to the first supporting portion, the second folded portion is unfolded relative to the second supporting portion, the first supporting portion, the second supporting portion, and the hanging portion are unfolded relative to the plate body, the first folded portion, the second folded portion, the hanging portion, the first supporting portion, the second supporting portion, and the plate body surround a shielding space, the first folded portion, the second folded portion, and the hanging portion are adapted for being combined with the body of the portable electronic device, and a display surface of the body is located in the shielding space.

The portable electronic device of the disclosure includes a body and a foldable light-shielding hood. The body has a display surface and a back surface opposite to the display surface. The foldable light-shielding hood includes a plate body, a first supporting portion, a second supporting portion, a hanging portion, a first folded portion, and a second folded portion. The first supporting portion is foldably disposed to a side of the plate body. The second supporting portion is foldably disposed to another side of the plate body. The hanging portion is foldably disposed to the plate body. The first folded portion is foldably disposed to the first supporting portion. The second folded portion is foldably disposed to the second supporting portion, and the hanging portion is located between the first folded portion and the second folded portion. The foldable light-shielding hood is adapted for transforming between a first state and a second state. In the first state, the first folded portion is folded on the first supporting portion, the second folded portion is folded on the second supporting portion, and the first supporting portion, the second supporting portion, and the hanging portion are folded on the plate body, so that the foldable light-shielding hood is adapted for hanging on the body through the hanging portion. In the second state, the first folded portion is unfolded relative to the first supporting portion, the second folded portion is unfolded relative to the second supporting portion, the first folded portion, the second folded portion, the hanging portion, the first supporting portion, the second supporting portion, and the plate body surround a shielding space, the first folded portion, the second folded portion, and the hanging portion are adapted for being combined with the back surface of the body, and the display surface is located in the shielding space.

In an embodiment of the disclosure, the plate body has a body portion and a third folded portion. The first folded portion is foldably disposed to a first side of the body portion, the second folded portion is foldably disposed to a second side of the body portion, the hanging portion is foldably disposed to a third side of the body portion, and the third folded portion is foldably disposed to a fourth side of the body portion. The body portion is located between the first folded portion and the second folded portion, and the body portion is located between the hanging portion and the third folded portion.

In an embodiment of the disclosure, the foldable light-shielding hood further includes multiple flexible connecting portions, respectively connected between the body portion and the first supporting portion, between the body portion and the second supporting portion, between the body portion and the hanging portion, between the body portion and the third folded portion, between the first folded portion and the first supporting portion, and between the second folded portion and the second supporting portion.

In an embodiment of the disclosure, the foldable light-shielding hood further includes multiple first combining members, multiple second combining members, and multiple third combining members. The multiple first combining members are disposed to the body portion. The multiple second combining members are respectively disposed to the first folded portion and the second folded portion, and the multiple second combining members correspond in position to the first combining members. The multiple third combining members are disposed to the third folded portion, and the third combining members correspond in position to the first combining members.

In an embodiment of the disclosure, the portable electronic device further includes multiple second combining members and a fourth combining member. The multiple second combining members are respectively disposed to the first folded portion and the second folded portion. The fourth combining member is disposed to the hanging portion. In the second state, these second combining members and the fourth combining member are adapted for combining the foldable light-shielding hood to the body.

Based on the above, in the foldable light-shielding hood and the portable electronic device of the disclosure, in the first state, the first folded portion is folded on the first supporting portion, the second folded portion is folded on the second supporting portion, the first supporting portion, the second supporting portion, and the hanging portion are folded on the plate body, so that the foldable light-shielding hood is adapted for hanging on the body through the hanging portion. The foldable light-shielding hood in the first state can be used as a protective cover. In the second state, the first folded portion is unfolded relative to the first supporting portion, the second folded portion is unfolded relative to the second supporting portion, the first folded portion, the second folded portion, the hanging portion, the first supporting portion, the second supporting portion, and the plate body surround a shielding space, and the first folded portion, the second folded portion, and the hanging portion are adapted for being combined with the back surface of the body, and the display surface is located in the shielding space. The foldable light-shielding hood in the second state can be used as a general light-shielding hood. By integrating the function of the protective cover to the light-shielding hood, a user only needs to carry a single object which is the foldable light-shielding hood, and can use the light-shielding hood function or the protective cover function of the foldable light-shielding hood according to the occasion, so the foldable light-shielding hood and the portable electronic device have excellent convenience in use.

In order to make the above-mentioned features and advantages of the disclosure more comprehensible and easy to understand, the following embodiments are given together with the attached drawings for detailed description as follows.

DESCRIPTION OF THE EMBODIMENTS

Figure 1:
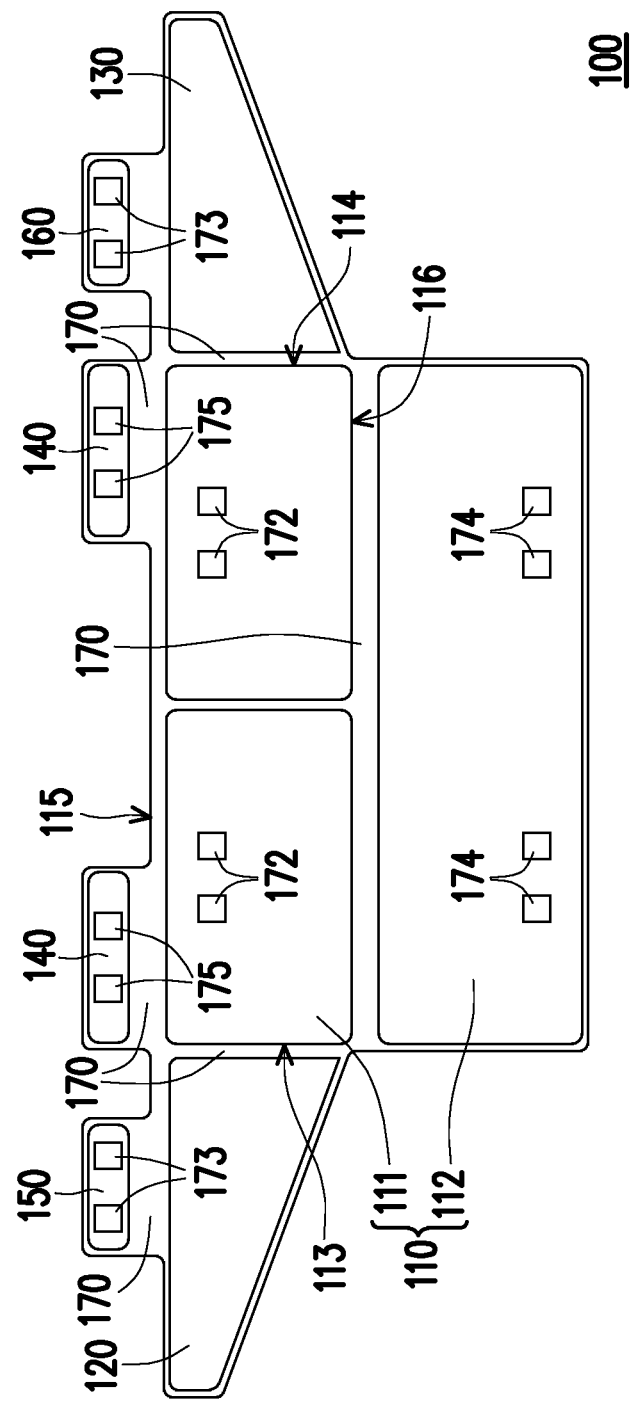
FIG. 1 is a schematic diagram of a foldable light-shielding hood according to an embodiment of the disclosure.

FIG. 1 is a schematic diagram of a foldable light-shielding hood according to an embodiment of the disclosure. FIG. 2 to FIG. 6 illustrate a process of the foldable light-shielding hood in FIG. 1 being transformed to a first state and hung on a body. FIG. 7 to FIG. 14 are schematic diagrams illustrating the transition of the foldable light-shielding hood in FIG. 6 to a second state. Please refer to FIG. 1, FIG. 5, FIG. 6 and FIG. 13, a portable electronic device 50 includes a body 51 and a foldable light-shielding hood 100, in which the body 51 may be a tablet computer or an iPad, but the disclosure is not limited thereto.

Specifically, the body 51 has a display surface 51a and a back surface 51b opposite to the display surface 51a. The foldable light-shielding hood 100 includes a plate body 110, a first supporting portion 120, a second supporting portion 130, a hanging portion 140, a first folded portion 150, and a second folded portion 160, in which a quantity of the hanging portion 140 is taken as an example in this embodiment to be two, but the disclosure is not limited thereto, and a single hanging portion 140 is used as an example below for illustration.

The first supporting portion 120 is foldably disposed to a side of the plate body 110. The second supporting portion 130 is foldably disposed to another side of the plate body 110. The hanging portion 140 is foldably disposed to the plate body 110. The first folded portion 150 is foldably disposed to the first supporting portion 120. The second folded portion 160 is foldably disposed to the second supporting portion 130, and the hanging portion 140 is located between the first folded portion 150 and the second folded portion 160. The foldable light-shielding hood 100 is adapted for transforming between the first state and the second state, in which the foldable light-shielding hood 100 shown in FIG. 6 and FIG. 7 is defined as the first state, while the foldable light-shielding hood 100 shown in FIG. 13 and FIG. 14 is defined as the second state.

Figure 6:
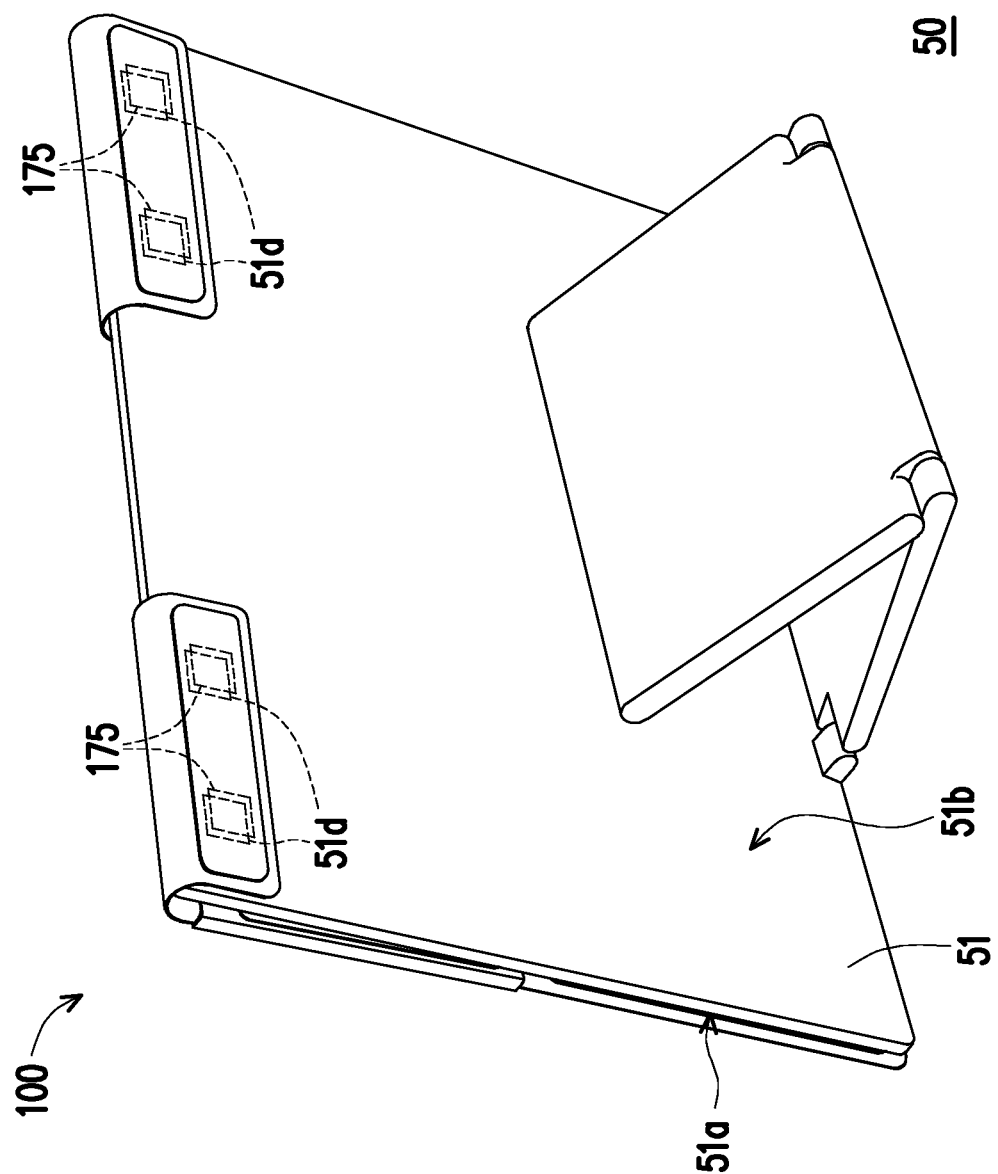
Figure 7:
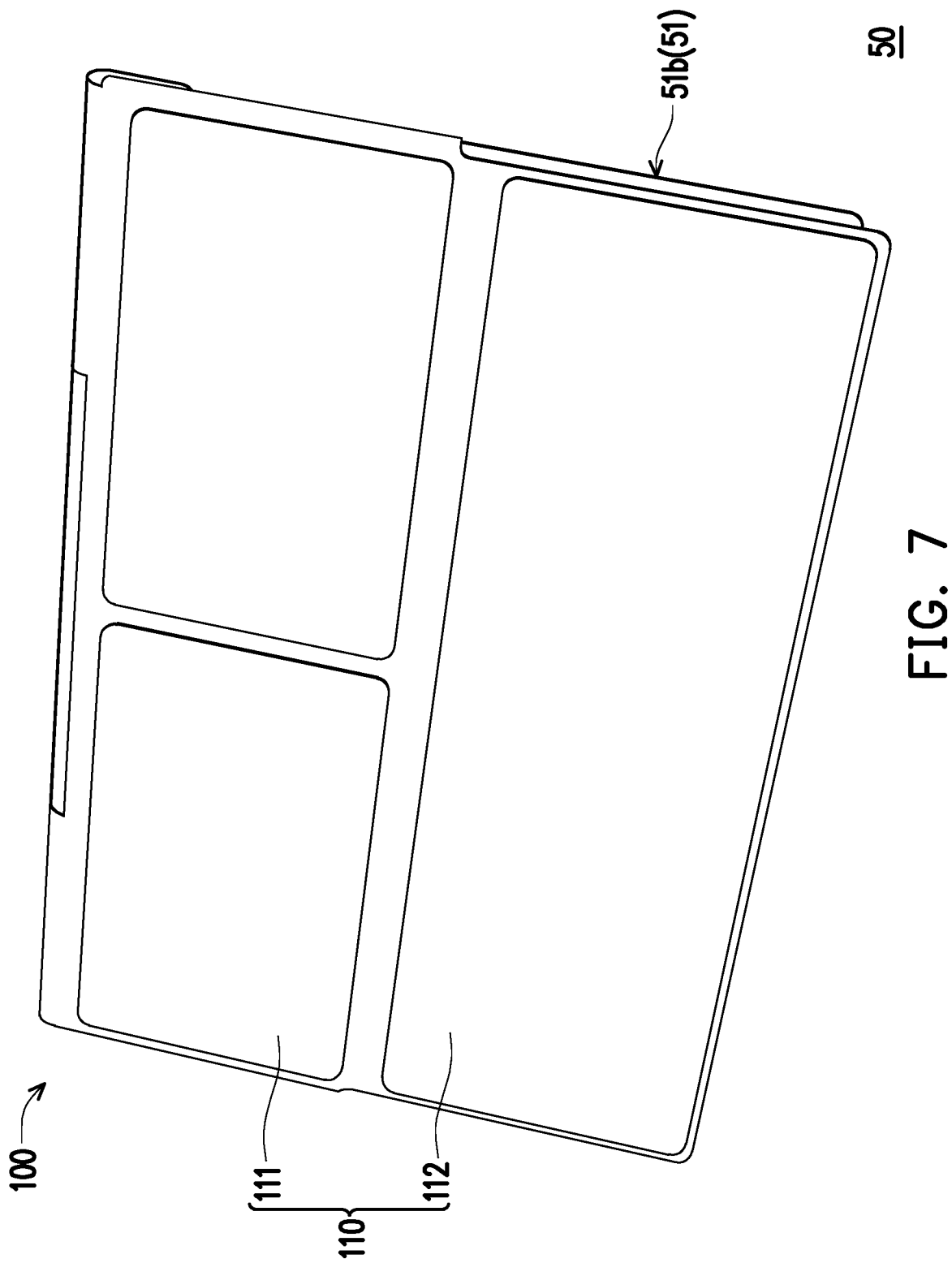
FIG. 7 to FIG. 14 are schematic diagrams illustrating the transition of the foldable light-shielding hood in FIG. 6 to a second state.

In the first state shown in FIG. 6 and FIG. 7, the first folded portion 150 is folded on the first supporting portion 120, the second folded portion 160 is folded on the second supporting portion 130, the first supporting portion 120, the second supporting portion 130, and the hanging portion 140 are folded on the plate body 110, so that the foldable light-shielding hood 100 is adapted for hanging on the body 51 through the hanging portion 140, and the foldable light-shielding hood 100 in the first state can be used as a protective cover.

Figure 13:
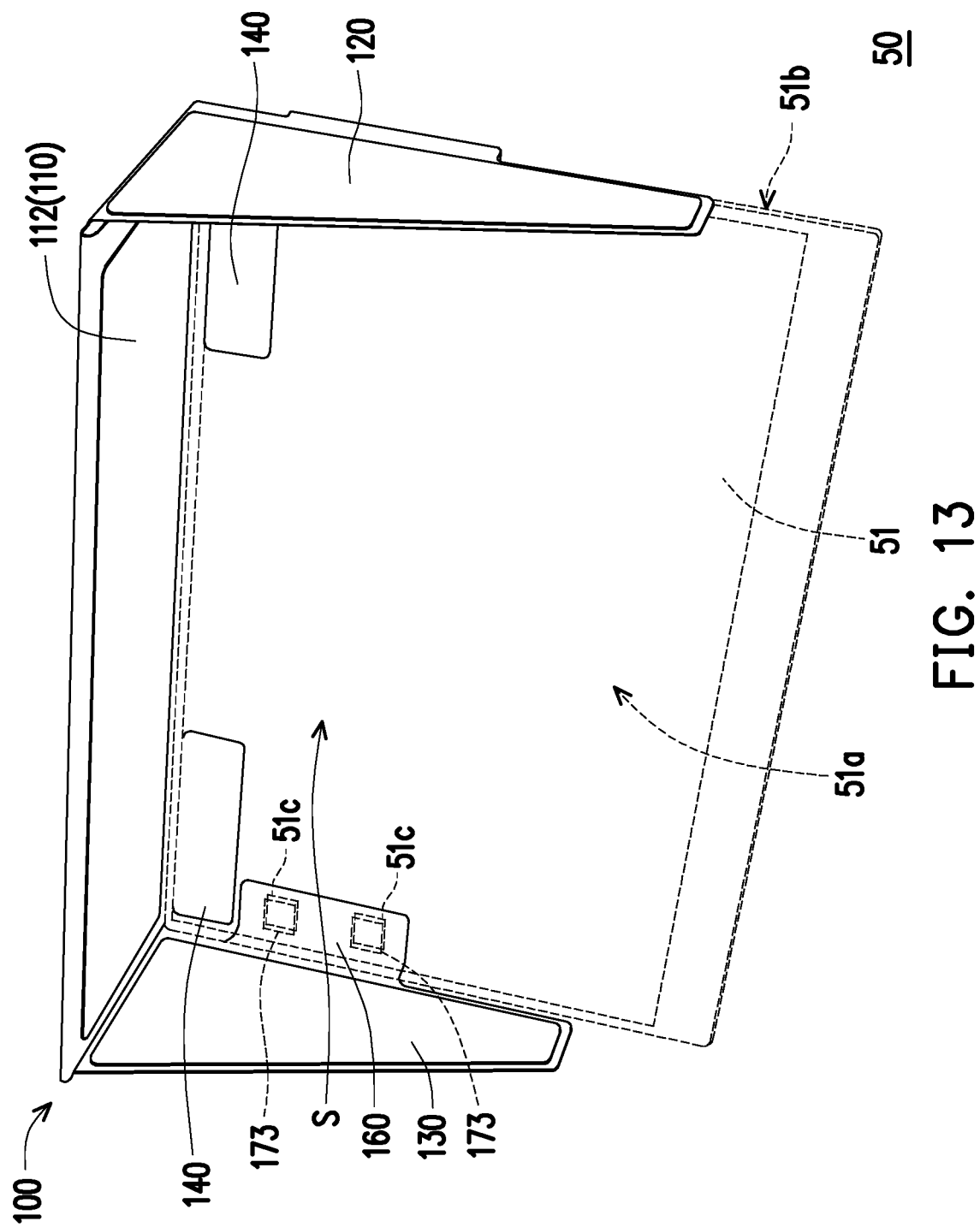
Figure 14:
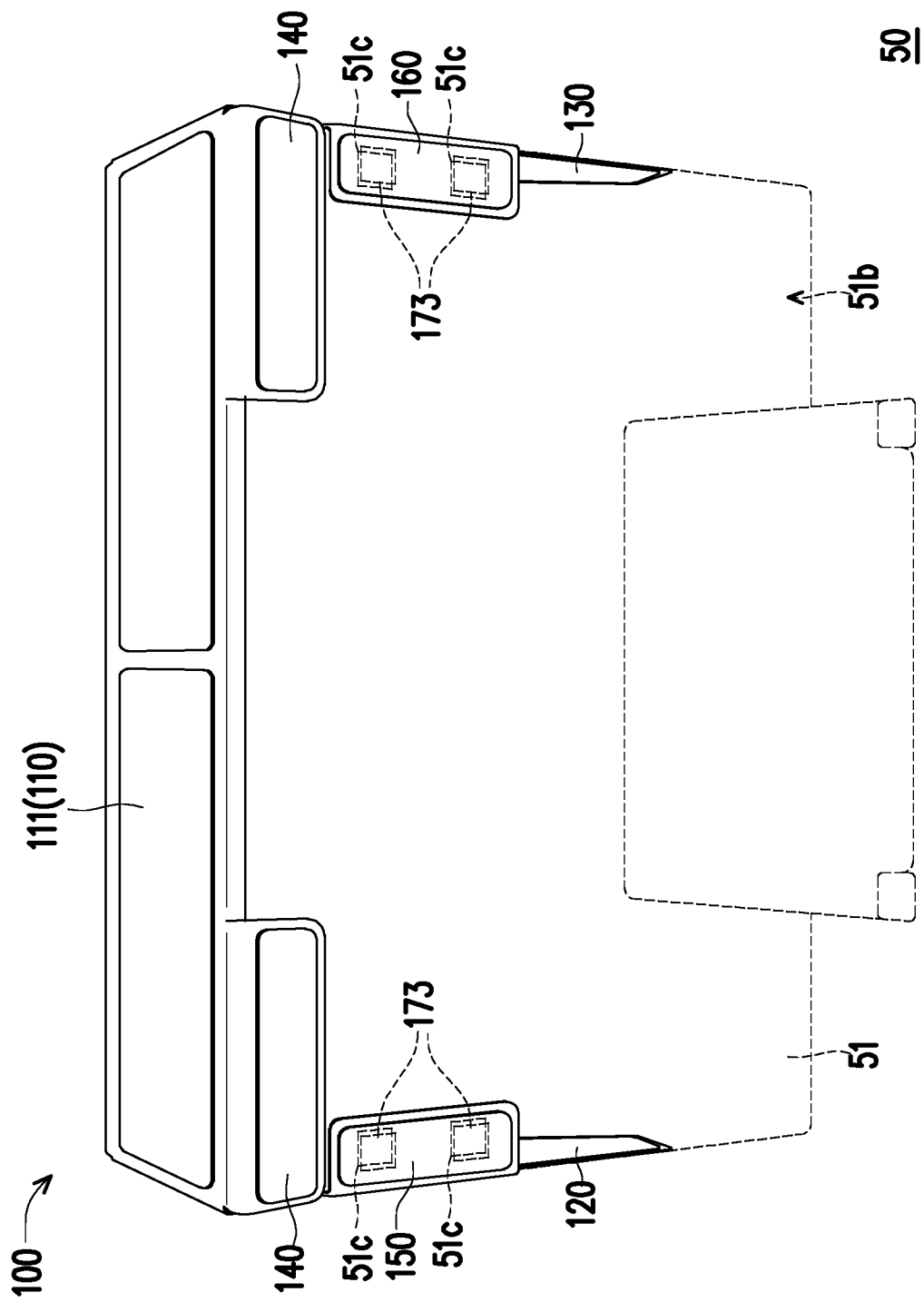

In the second state shown in FIG. 13 and FIG. 14, the first folded portion 150 is unfolded relative to the first supporting portion 120, the second folded portion 160 is unfolded relative to the second supporting portion 130, the first folded portion 150, the second folded portion 160, the hanging portion 140, the first supporting portion 120, the second supporting portion 130, and the plate body 110 surround a shielding space S, and the first folded portion 150, the second folded portion 160, and the hanging portion 140 are adapted for being combined with the back surface 51b of the body 51, and the display surface 51a is located in the shielding space S, the foldable light-shielding hood 100 in the second state can be used as a general light-shielding hood. By integrating the function of the protective cover to the light-shielding hood, a user only needs to carry a single object which is the foldable light-shielding hood 100, and can use a light-shielding hood function or a protective cover function of the foldable light-shielding hood 100 according to the occasion, so the foldable light-shielding hood 100 and the portable electronic device 50 have excellent convenience in use.

Please refer to FIG. 1, the plate body 110 has a body portion 111 and a third folded portion 112. The first folded portion 150 is foldably disposed to a first side 113 of the body portion 111, the second folded portion 160 is foldably disposed to a second side 114 of the body portion 111, the hanging portion 140 is foldably disposed to a third side 115 of the body portion 111, and the third folded portion 112 is foldably disposed to a fourth side 116 of the body portion 111. The first side 113, the second side 114, the third side 115, and the fourth side 116 are located around the body portion 111, the body portion 111 is located between the first folded portion 150 and the second folded portion 160, and the body portion 111 is located between the hanging portion 140 and the third folded portion 112.

Further referring to FIG. 11, FIG. 12, FIG. 13, and FIG. 14, when the foldable light-shielding hood 100 is actually used, the third folded portion 112 may be folded on the body portion 111 to prevent the third folded portion 112 from protruding from the body portion 111 and interfering with the user watching images displayed on the display surface 51a.

Please refer to FIG. 1, the foldable light-shielding hood 100 further includes multiple flexible connecting portions 170, respectively connected between the body portion 111 and the first supporting portion 120, between the body portion 111 and the second supporting portion 130, between the body portion 111 and the hanging portion 140, between the body portion 111 and the third folded portion 112, between the first folded portion 150 and the first supporting portion 120, and between the second folded portion 160 and the second supporting portion 130. In other words, through the multiple flexible connecting portions 170, respective parts of the foldable light-shielding hood 100 may be folded with each other to be transformed to the first state or the second state.

In addition, the foldable light-shielding hood 100 further includes multiple first combining member 172, multiple second combining members 173, multiple third combining members 174, and a fourth combining member 175. The body 51 has multiple fifth combining members 51c and a sixth combining member 51d. These first combining members 172 are disposed to the body portion 111. The second combining members 173 are respectively disposed to the first folded portion 150 and the second folded portion 160, and the second combining members 173 correspond in position to the first combining members 172 and the fifth combining members 51c. The third combining members 174 are disposed to the third folded portion 112, and the third combining members 174 correspond in position to the first combining members 172. The fourth combining member 175 is disposed to the hanging portion 140, and the fourth combining member 175 corresponds in position to the sixth combining member 51d. In the second state, the second combining members 173 are adapted for cooperating with the multiple fifth combining members 51c, and the fourth combining member 175 is adapted for cooperating with the sixth combining member 51d, so that the foldable light-shielding hood 100 is combined with the body 51.

For example, the first combining member 172, the second combining member 173, the third combining member 174, the fourth combining member 175, the fifth combining member 51c, and the sixth combining member 51d are magnets, in which the first combining member 172 and the second combining member 173 may be magnetically attracted to each other, the first combining member 172 and the third combining member 174 may be magnetically attracted to each other, the second combining member 173 and the fifth combining member 51c may be magnetically attracted to each other, and the fourth combining member 175 and the sixth combining member 51d may be magnetically attracted to each other.

In other embodiments, the first combining member and the second combining member may be structurally matched Velcro felt or fasteners, the first combining member and third combining member may be structurally matched Velcro felt or fasteners, and the second combining member and the fifth combining member may be structurally matched Velcro felt or fasteners, and the fourth combining member and the sixth combining member may be structurally matched Velcro felt or fasteners, but the disclosure is not limited thereto.

An operation process of installing the foldable light-shielding hood 100 to the body 51 of the portable electronic device 50 will be described below.

Figure 2:
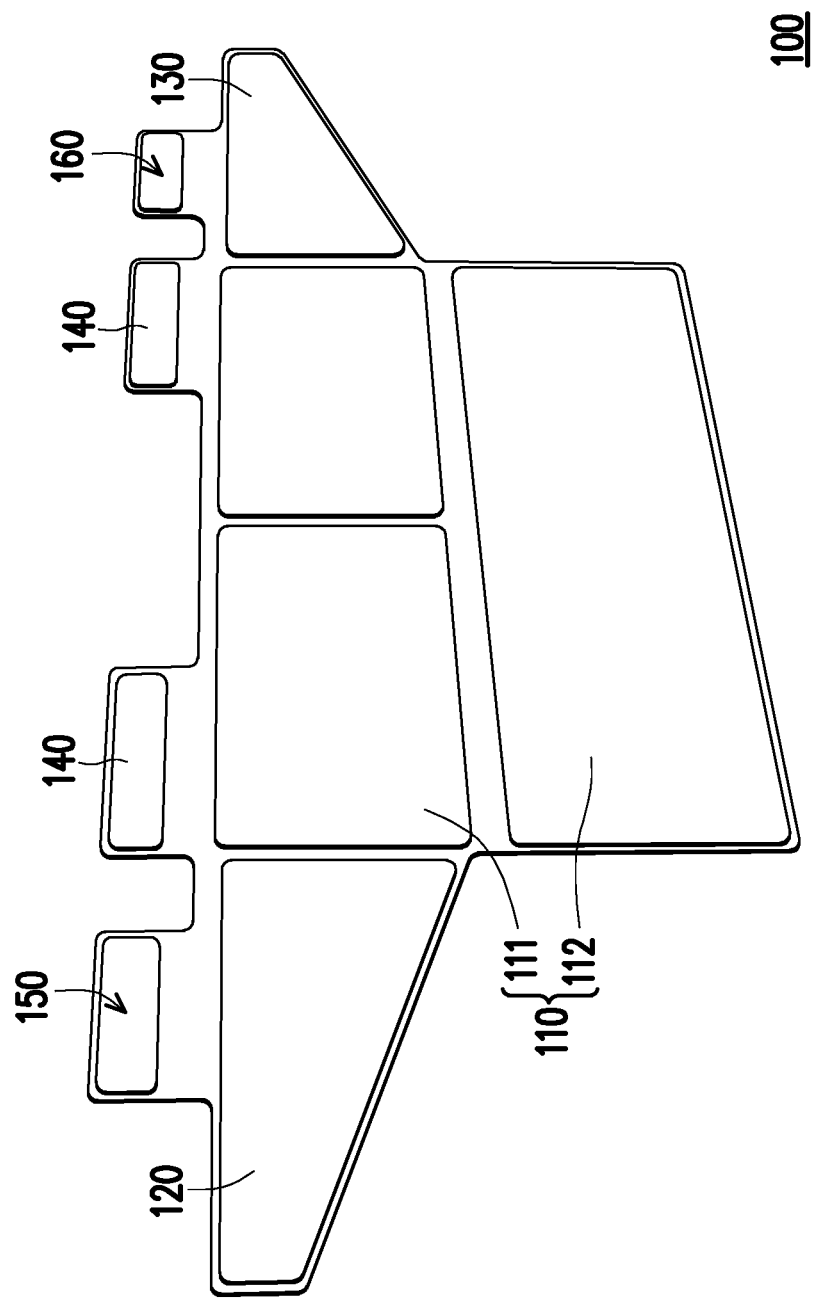
FIG. 2 to FIG. 6 illustrate a process of the foldable light-shielding hood in FIG. 1 being transformed to a first state and hung on a body.

Please refer to FIG. 2. The foldable light-shielding hood 100 may be fully unfolded, so that the respective parts of the foldable light-shielding hood 100 do not overlap with each other, that is, the body portion 111, the first supporting portion 120, the second supporting portion 130, the hanging portion 140, the first folded portion 150, the second folded portion 160, and the third folded portion 112 do not overlap each other.

Figure 3:
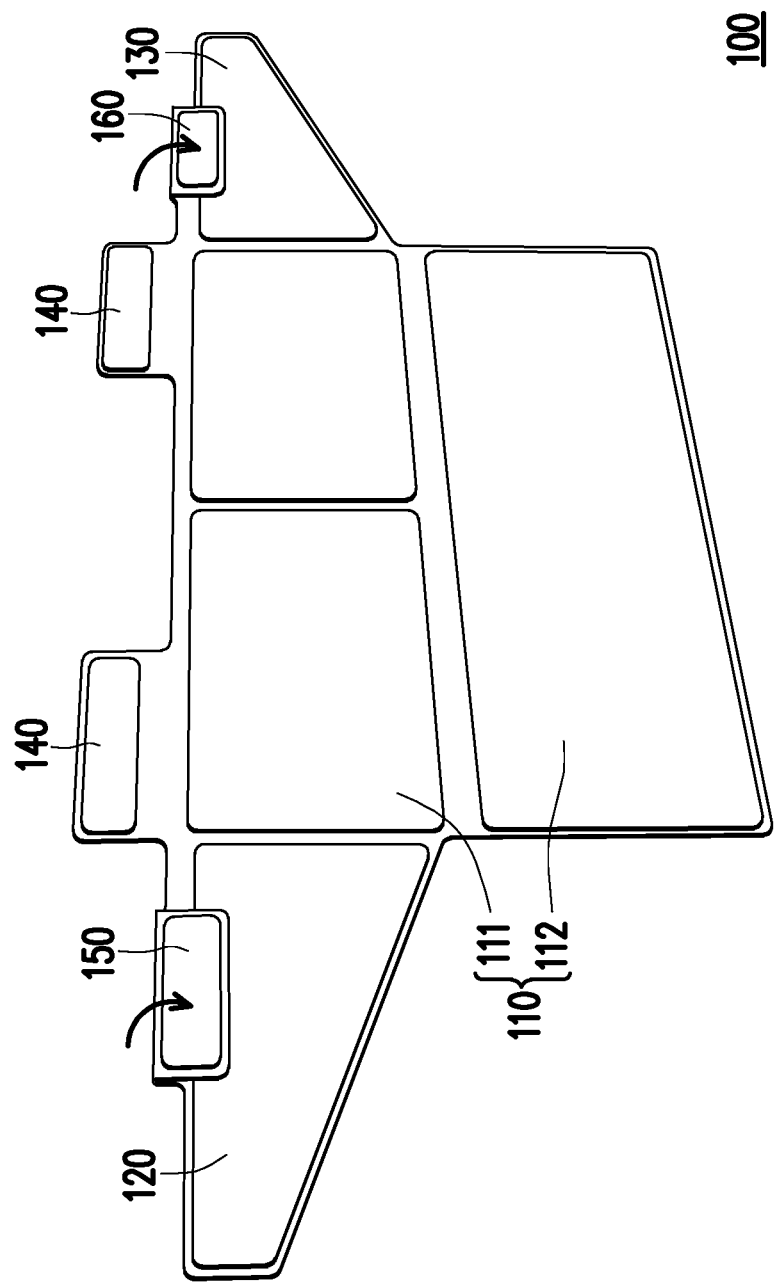

In operations shown in FIG. 3, the first folded portion 150 is folded on the first supporting portion 120, and the second folded portion 160 is folded on the second supporting portion 130.

Figure 4:
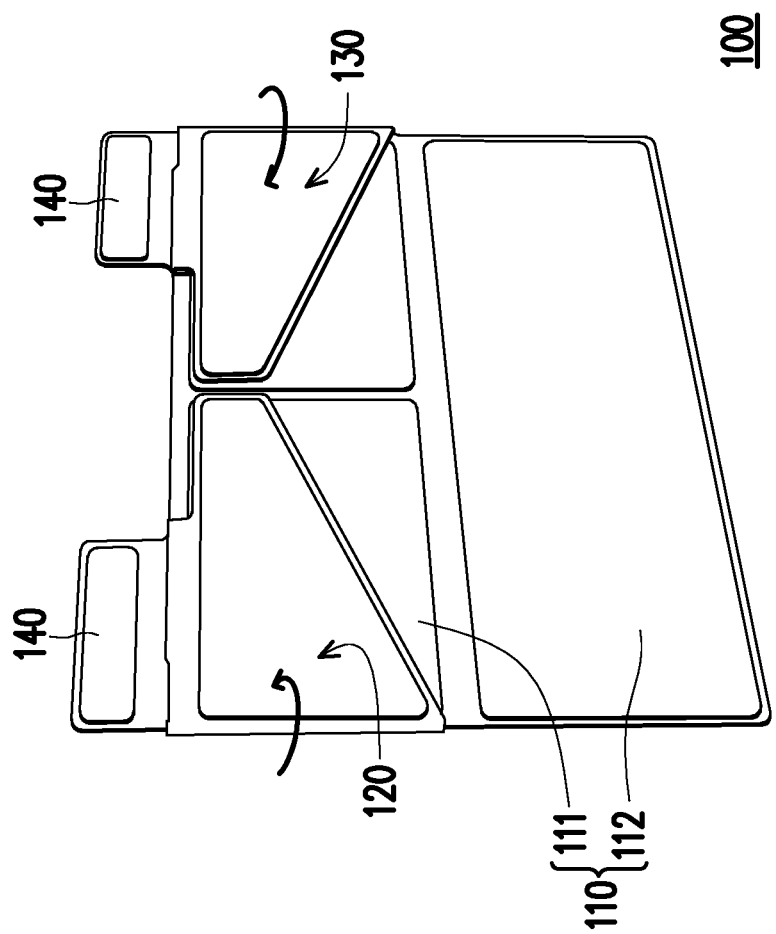

In operations shown in FIG. 3 to FIG. 4, the first supporting portion 120 is further folded on the body portion 111, and the second supporting portion 130 is folded on the second folded portion 160. At this time, the first folded portion 150 and the second folded portion 160 are firmly folded on the body portion 111 through the magnetic attraction between the second combining member 173 and the first combining member 172 respectively, in which the first folded portion 150 is located between the body portion 111 and the first supporting portion 120, and the second folded portion 160 is located between the body portion 111 and the second supporting portion 130.

Figure 5:
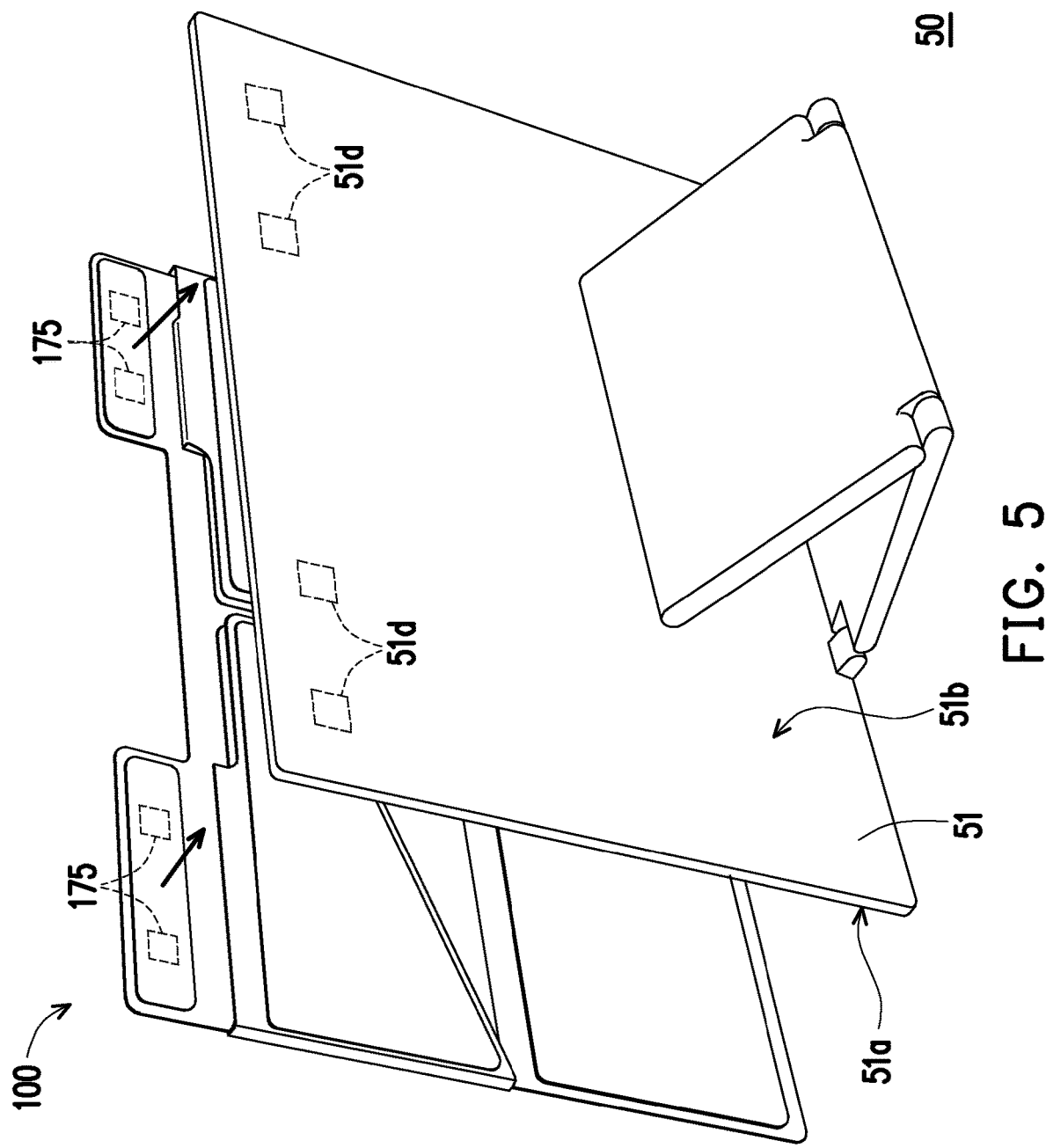

In operations shown in FIG. 5 to FIG. 6 and FIG. 7, and referring to FIG. 1 at the same time, put the foldable light-shielding hood 100 in FIG. 4 to the display surface 51a of the body 51, and the hanging portion 140 is folded on the body portion 111, the user may hang the foldable light-shielding hood 100 on the body 51 through the hanging portion 140, at this time, the fourth combining member 175 may be combined with the sixth combining member 51d to prevent the foldable light-shielding hood 100 from being separated from the body 51, so as to protect the display surface 51a of the body 51 and prevent the display surface 51a of the body 51 from being damaged.

Figure 8:
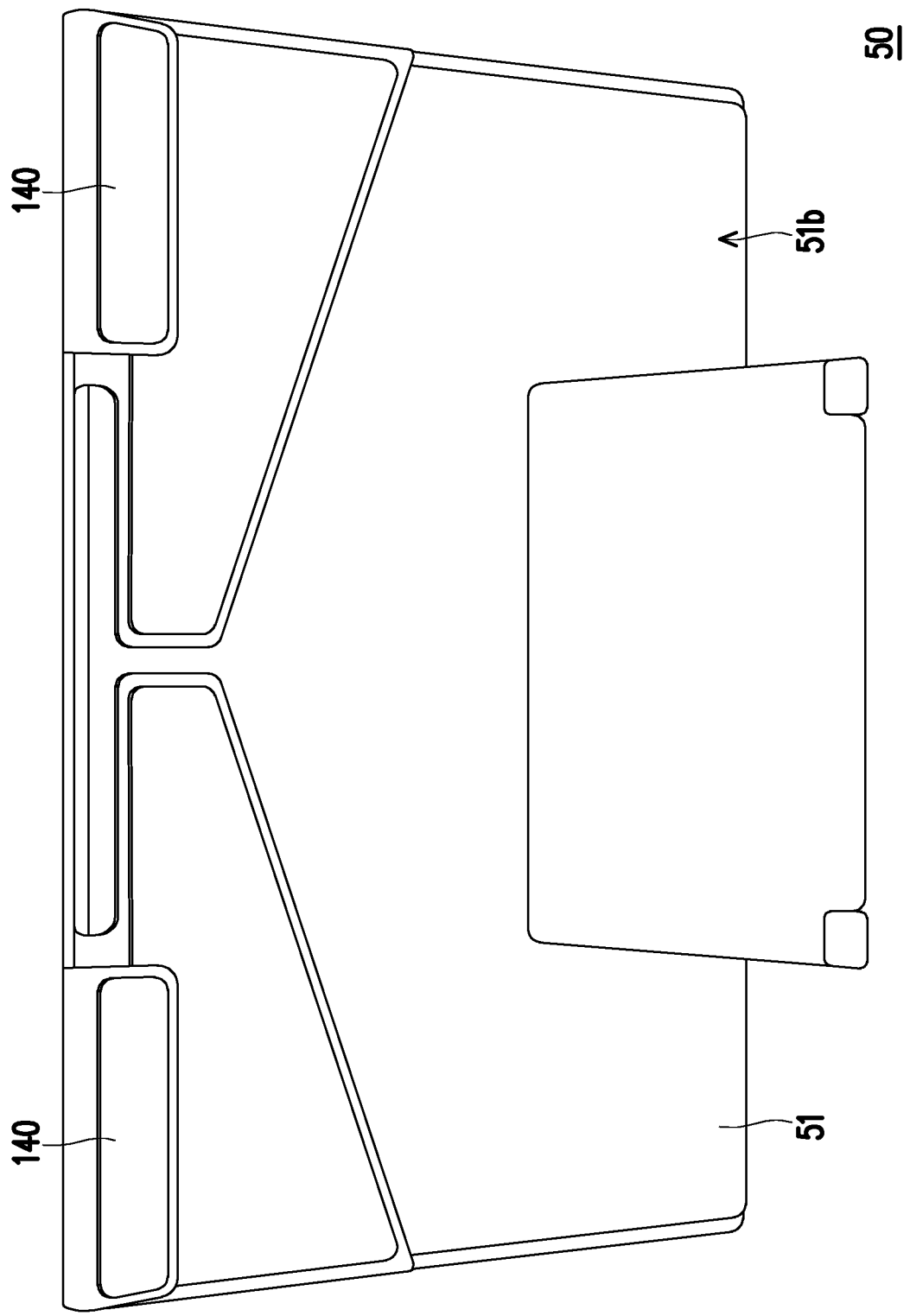
Figure 9:
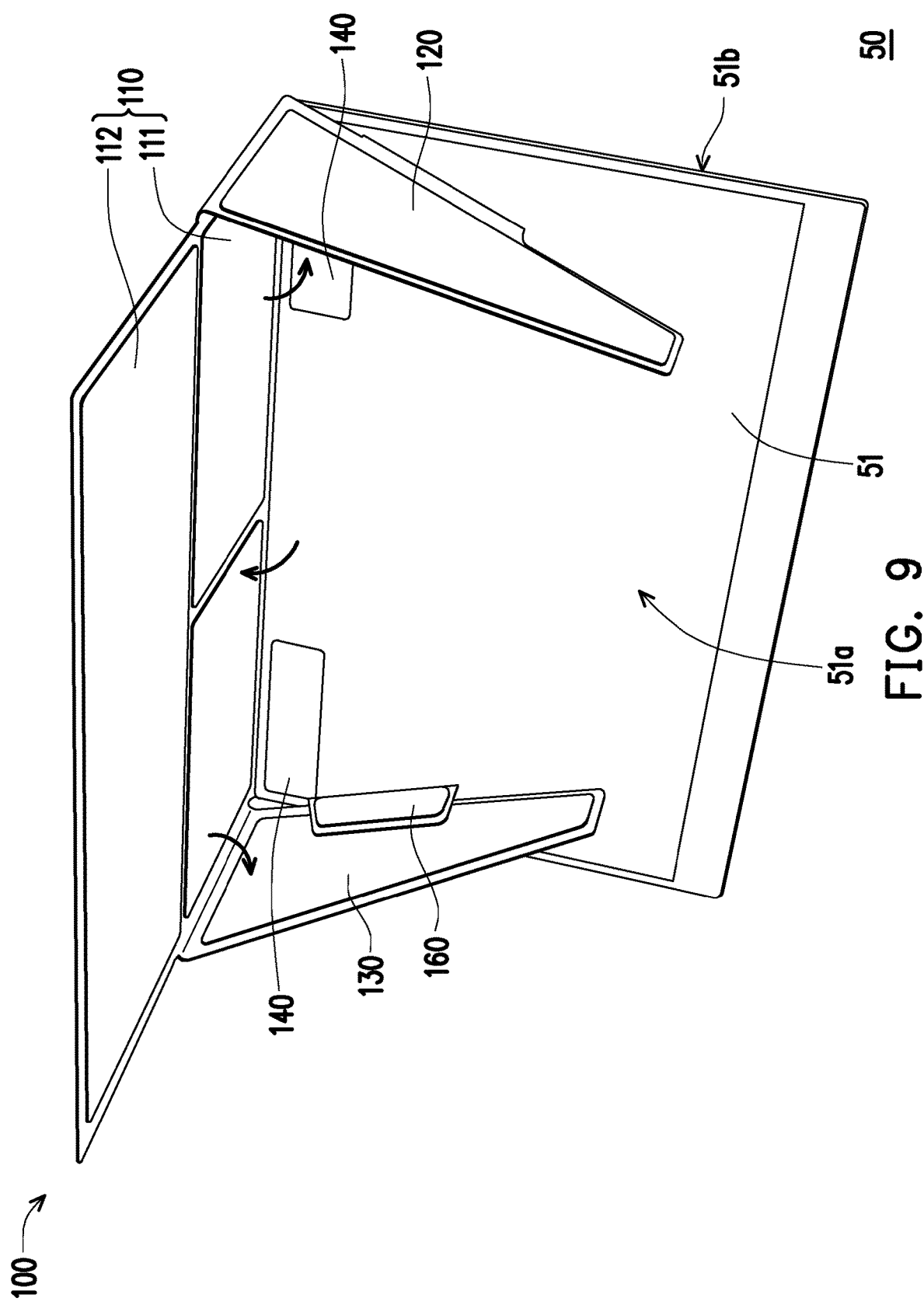
Figure 10:
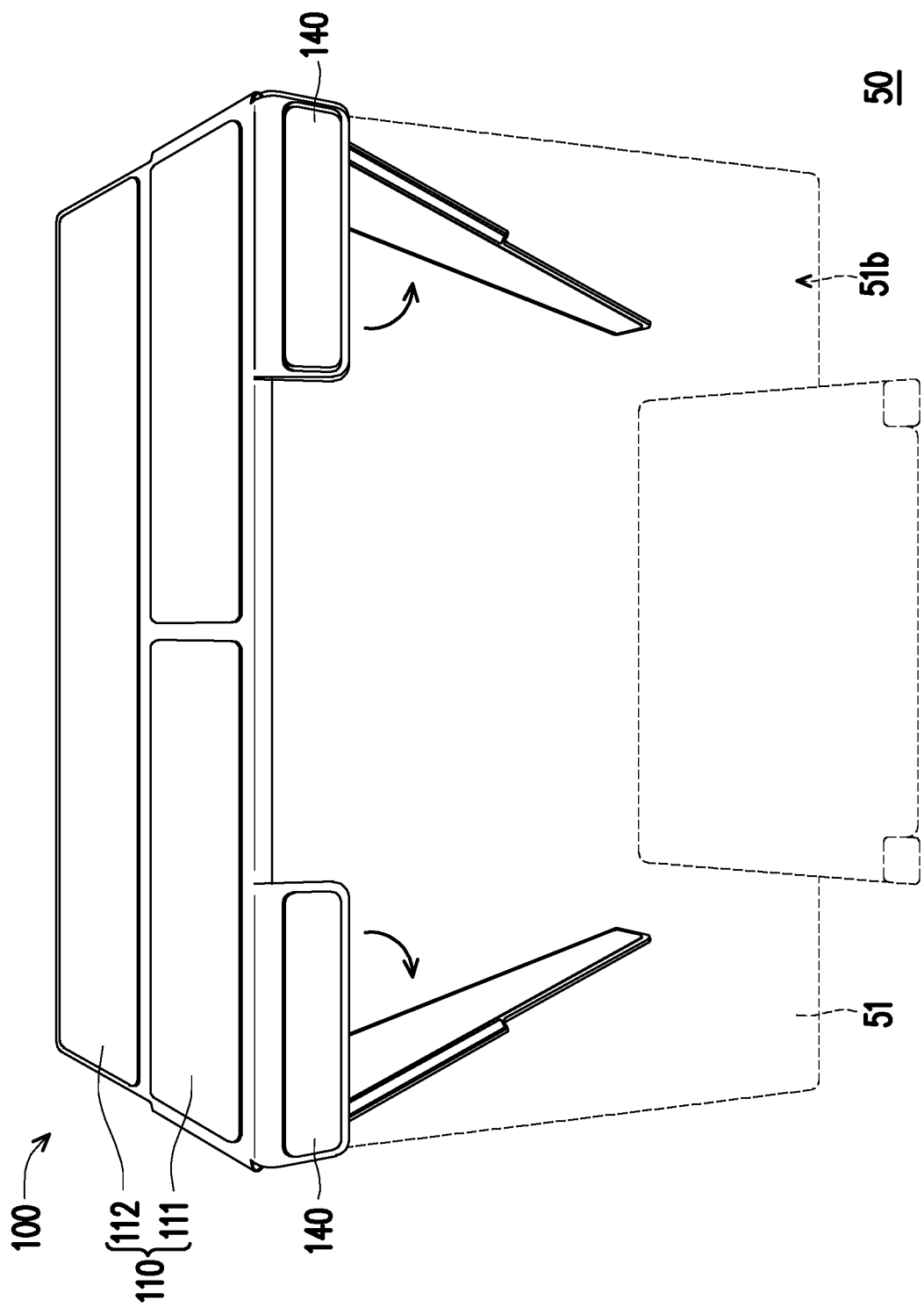

In operations shown in FIG. 8 to FIG. 9 and FIG. 10, in a state that the foldable light-shielding hood 100 is hung on the body 51, the plate body 110 is turned away from the display surface 51a. At this time, the first supporting portion 120 and the second supporting portion 130 may be turned away with respect to the body portion 111.

Figure 11:
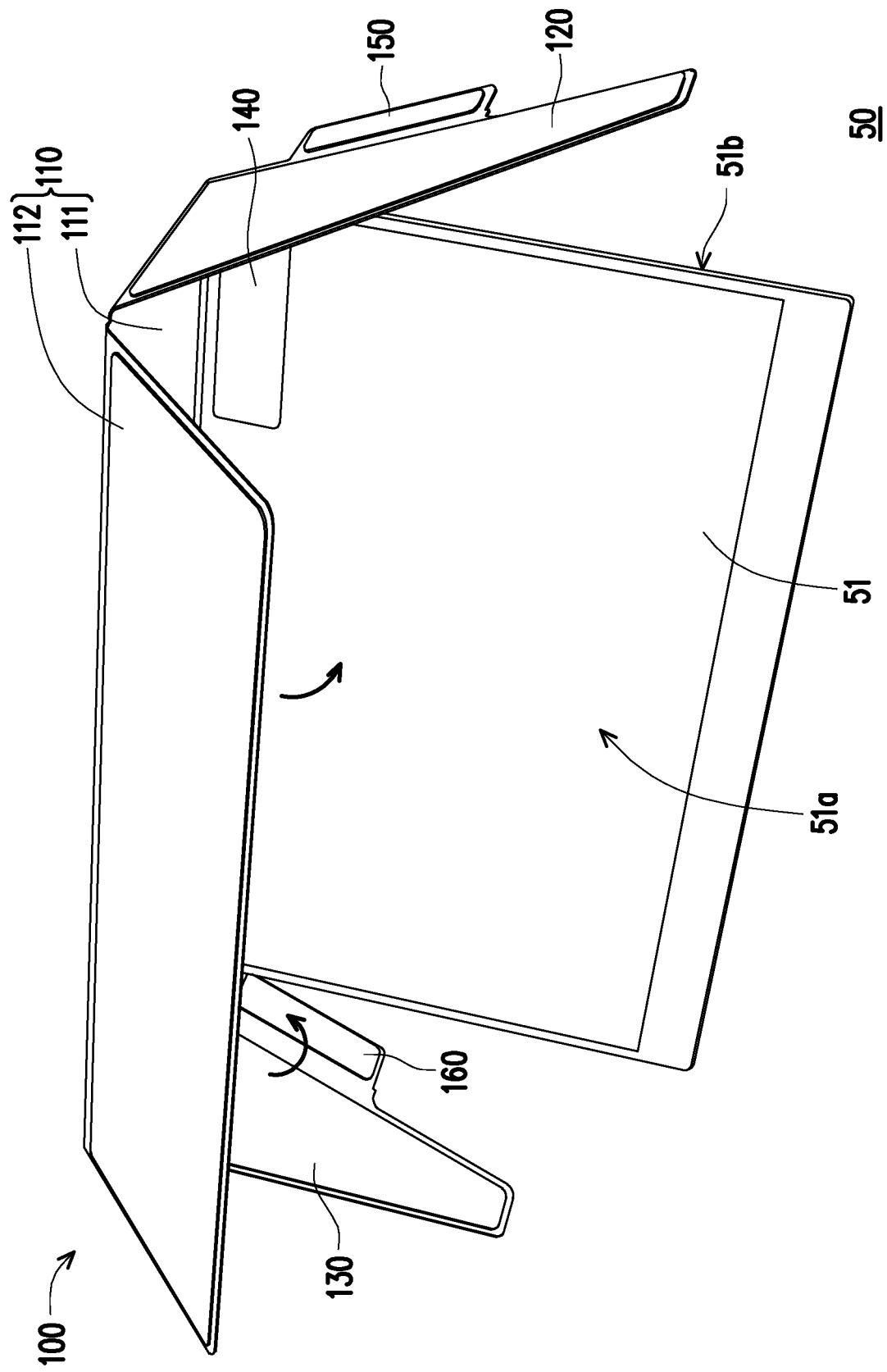
Figure 12:
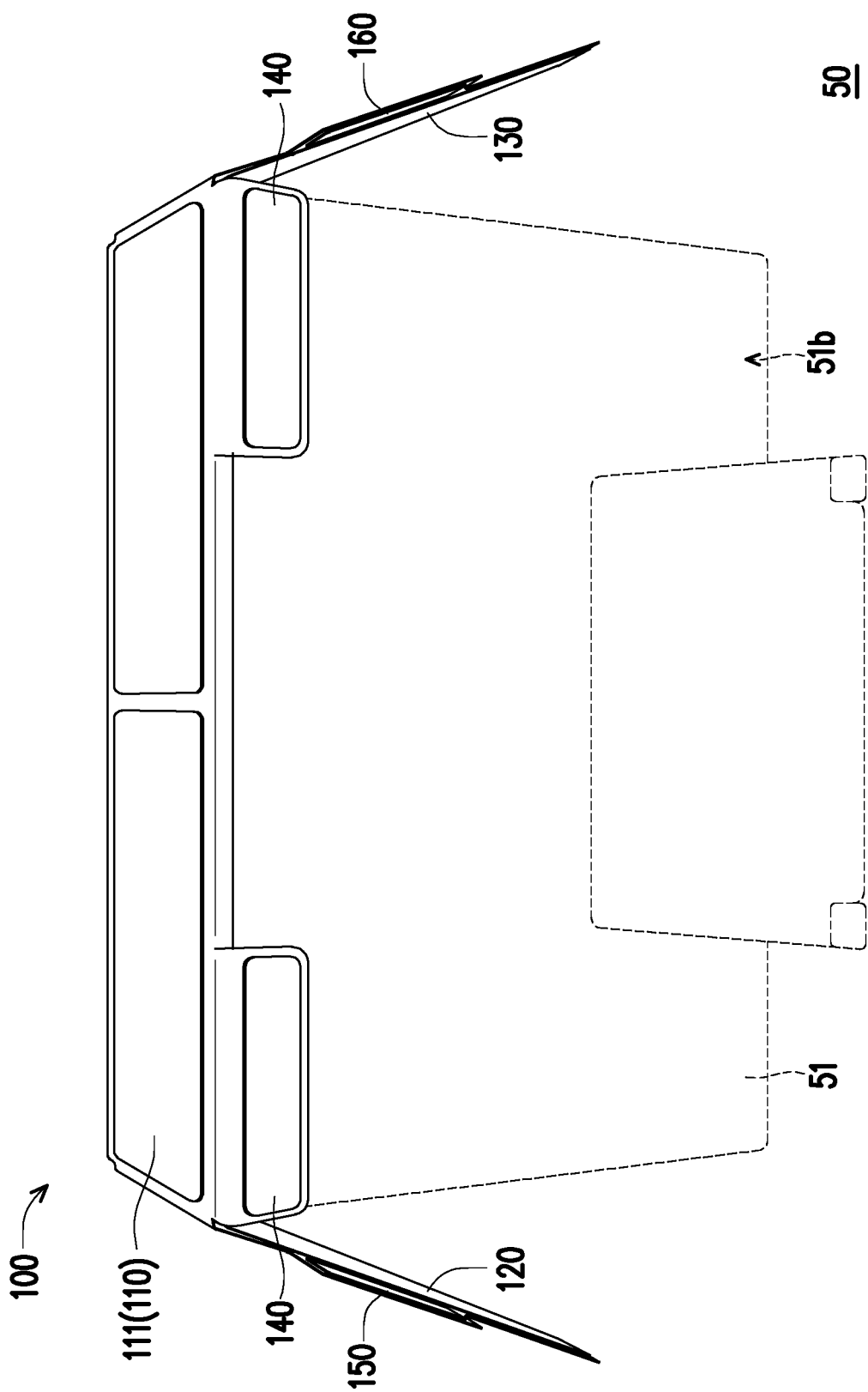

In operations shown in FIG. 10 to FIG. 11 and FIG. 12, the first folded portion 150 is turned away from the first supporting portion 120, the second folded portion 160 is turned away from the second supporting portion 130, and the third folded portion 112 is turned over toward the body portion 111.

In operations shown in FIG. 12 to FIG. 13 and FIG. 14, and referring to FIG. 1 at the same time, the first folded portion 150 and the second folded portion 160 are combined through the second combining member 173 and the fifth combining member 51c respectively, so that the foldable light-shielding hood 100 is combined with the body 51.

In summary, in the foldable light-shielding hood and the portable electronic device of the disclosure, in the first state, the first folded portion is folded on the first supporting portion, the second folded portion is folded on the second supporting portion, the first supporting portion, the second supporting portion, and the hanging portion are folded on the plate body, so that the foldable light-shielding hood is adapted for hanging on the body through the hanging portion. The foldable light-shielding hood in the first state can be used as a protective cover. In the second state, the first folded portion is unfolded relative to the first supporting portion, the second folded portion is unfolded relative to the second supporting portion, the first folded portion, the second folded portion, the hanging portion, the first supporting portion, the second supporting portion, and the plate body surround a shielding space, and the first folded portion, the second folded portion, and the hanging portion are adapted for being combined with the back surface of the body, and the display surface is located in the shielding space. The foldable light-shielding hood in the second state can be used as a general light-shielding hood. By integrating the function of the protection cover to the light-shielding hood, the user only needs to carry a single object which is the foldable light-shielding hood, and can use the light-shielding hood function or the protective cover function of the foldable light-shielding hood according to the occasion, so the foldable light-shielding hood and the portable electronic device have excellent convenience in use.

Although the disclosure has been disclosed above with the embodiments, the embodiments are not intended to limit the disclosure. Persons with ordinary knowledge in the technical field may make some changes and modifications without departing from the spirit and scope of the disclosure. The scope of protection of the disclosure should be defined by the scope of the appended claims.

What is claimed is:

1. A foldable light-shielding hood, comprising:
   a plate body;
   a first supporting portion, foldably disposed to a side of the plate body;
   a second supporting portion, foldably disposed to another side of the plate body;
   a hanging portion, foldably disposed to the plate body;
   a first folded portion, foldably disposed to the first supporting portion; and
   a second folded portion, foldably disposed to the second supporting portion, and the hanging portion is located between the first folded portion and the second folded portion,
   wherein the foldable light-shielding hood is adapted for transforming between a first state and a second state, in the first state, the first folded portion is folded on the first supporting portion, the second folded portion is folded on the second supporting portion, the first supporting portion, the second supporting portion, and the hanging portion are folded on the plate body, so that the foldable light-shielding hood is adapted for hanging on a body of a portable electronic device through the hanging portion; in the second state, the first folded portion is unfolded relative to the first supporting portion, the second folded portion is unfolded relative to the second supporting portion, the first supporting portion, the second supporting portion, and the hanging portion are unfolded relative to the plate body, the first folded portion, the second folded portion, the hanging portion, the first supporting portion, the second supporting portion, and the plate body surround a shielding space, the first folded portion, the second folded portion, and the hanging portion are adapted for being combined with the body of the portable electronic device, and a display surface of the body is located in the shielding space.

2. The foldable light-shielding hood according to claim 1, wherein the plate body has a body portion and a third folded portion, the first folded portion is foldably disposed to a first side of the body portion, the second folded portion is foldably disposed to a second side of the body portion, the hanging portion is foldably disposed to a third side of the body portion, and the third folded portion is foldably disposed to a fourth side of the body portion, wherein the body portion is located between the first folded portion and the second folded portion, and the body portion is located between the hanging portion and the third folded portion.

3. The foldable light-shielding hood according to claim 2, further comprising:
   a plurality of flexible connecting portions respectively connected between the body portion and the first supporting portion, between the body portion and the second supporting portion, between the body portion and the hanging portion, between the body portion and the third folded portion, between the first folded portion and the first supporting portion, and between the second folded portion and the second supporting portion.

4. The foldable light-shielding hood according to claim 2, further comprising:
   a plurality of first combining members, disposed to the body portion;
   a plurality of second combining members respectively disposed to the first folded portion and the second folded portion and corresponding in position to the first combining members; and
   a plurality of third combining members disposed to the third folded portion and corresponding in position to the first combining members.

5. The foldable light-shielding hood according to claim 1, further comprising:
   a plurality of second combining members respectively disposed to the first folded portion and the second folded portion; and
   a fourth combining member, disposed to the hanging portion,
   wherein in the second state, the second combining members and the fourth combining member are adapted for combining the foldable light-shielding hood to the body.

6. A portable electronic device, comprising:
   a body having a display surface and a back surface opposite to the display surface; and
   a foldable light-shielding hood comprising:
      a plate body;
      a first supporting portion, foldably disposed to a side of the plate body;
      a second supporting portion, foldably disposed to another side of the plate body;
      a hanging portion, foldably disposed to the plate body;
      a first folded portion, foldably disposed to the first supporting portion; and
      a second folded portion, foldably disposed to the second supporting portion, and the hanging portion is located between the first folded portion and the second folded portion, wherein the foldable light-shielding hood is adapted for transforming between a first state and a second state, in the first state, the first folded portion is folded on the first supporting portion, the second folded portion is folded on the second supporting portion, the first supporting portion, the second supporting portion, and the hanging portion are folded on the plate body, so that the foldable light-shielding hood is adapted for hanging on the body through the hanging portion; in the second state, the first folded portion is unfolded relative to the first supporting portion, the second folded portion is unfolded relative to the second supporting portion, the first folded portion, the second folded portion, the hanging portion, the first supporting portion, the second supporting portion, and the plate body surround a shielding space, the first folded portion, the second folded portion, and the hanging portion are adapted for being combined with the back surface of the body, and the display surface is located in the shielding space.

7. The portable electronic device according to claim 6, wherein the plate body has a body portion and a third folded portion, the first folded portion is foldably disposed to a first side of the body portion, the second folded portion is foldably disposed to a second side of the body portion, the hanging portion is foldably disposed to a third side of the body portion, and the third folded portion is foldably disposed to a fourth side of the body portion, wherein the body portion is located between the first folded portion and the second folded portion, and the body portion is located between the hanging portion and the third folded portion.

8. The portable electronic device according to claim 7, further comprising:

a plurality of flexible connecting portions respectively connected between the body portion and the first supporting portion, between the body portion and the second supporting portion, between the body portion and the hanging portion, between the body portion and the third folded portion, between the first folded portion and the first supporting portion, and between the second folded portion and the second supporting portion.

9. The portable electronic device according to claim 7, further comprising:

a plurality of first combining members, disposed to the body portion;

a plurality of second combining members respectively disposed to the first folded portion and the second folded portion and corresponding in position to the first combining members; and a plurality of third combining members disposed to the third folded portion and correspond in position to the first combining members.

10. The portable electronic device according to claim 6, further comprising:

a plurality of second combining members respectively disposed to the first folded portion and the second folded portion; and a fourth combining member, disposed to the hanging portion, wherein in the second state, the second combining members and the fourth combining member are adapted for combining the foldable light-shielding hood to the body.

* * * * *